(12) United States Patent
Johnson et al.

(10) Patent No.: US 9,360,737 B2
(45) Date of Patent: Jun. 7, 2016

(54) COLLAPSIBLE LIGHT BOX

(71) Applicants: Aaron Johnson, Orem, UT (US); Kelly Beffrey, Petaluma, CA (US); Philip Beffrey, Petaluma, CA (US); Daniel B. Lyke, Petaluma, CA (US); Shane McKenna, Salt Lake City, UT (US)

(72) Inventors: Aaron Johnson, Orem, UT (US); Kelly Beffrey, Petaluma, CA (US); Philip Beffrey, Petaluma, CA (US); Daniel B. Lyke, Petaluma, CA (US); Shane McKenna, Salt Lake City, UT (US)

( * ) Notice: Subject to any disclaimer, the term of this patent is extended or adjusted under 35 U.S.C. 154(b) by 0 days.

(21) Appl. No.: 14/749,319

(22) Filed: Jun. 24, 2015

(65) Prior Publication Data

US 2015/0370146 A1 Dec. 24, 2015

Related U.S. Application Data

(60) Provisional application No. 62/016,521, filed on Jun. 24, 2014, provisional application No. 62/114,863, filed on Feb. 11, 2015.

(51) Int. Cl.
*G03B 15/00* (2006.01)
*G03B 15/07* (2006.01)

(52) U.S. Cl.
CPC ..................................... *G03B 15/07* (2013.01)

(58) Field of Classification Search
CPC ........ G03B 15/00; G03B 15/02; G03B 15/06; G03B 15/07
USPC .......................................................... 396/4
See application file for complete search history.

(56) References Cited

U.S. PATENT DOCUMENTS

| | | | |
|---|---|---|---|
| 3,310,901 A | 3/1967 | Sarkisian | |
| 3,643,085 A | 2/1972 | Durand | |
| 4,490,776 A | 12/1984 | Kluch | |
| 5,094,188 A * | 3/1992 | Wolak | A01K 1/0125 119/168 |
| 5,311,409 A | 5/1994 | King | |
| 5,828,908 A * | 10/1998 | Mauchan | G03B 27/323 396/2 |
| 6,672,737 B2 | 1/2004 | Lai et al. | |
| 6,948,826 B2 | 9/2005 | Fogerlie | |
| 7,055,976 B2 | 6/2006 | Blanford | |
| 7,396,148 B1 * | 7/2008 | Tsai | G03B 15/03 362/17 |
| 7,431,251 B2 | 10/2008 | Carnevali | |
| 7,680,401 B1 * | 3/2010 | Adelstein | A45C 9/00 396/1 |
| 2003/0193800 A1 * | 10/2003 | Lai | G03B 15/03 362/240 |
| 2003/0206735 A1 * | 11/2003 | Saigo | G03B 15/06 396/1 |
| 2004/0042231 A1 * | 3/2004 | Lai | G09F 13/04 362/539 |
| 2005/0243538 A1 * | 11/2005 | Blanford | G03B 15/06 362/16 |

(Continued)

FOREIGN PATENT DOCUMENTS

CN 102423231 4/2012

OTHER PUBLICATIONS

PCT/US2015/037462 International Search Report and Written Opinion, Sep. 17, 2015.

*Primary Examiner* — Clayton E Laballe
*Assistant Examiner* — Fang-Chi Chang
(74) *Attorney, Agent, or Firm* — Kunzler Law Group

(57) ABSTRACT

Apparatuses, systems, and methods are disclosed for a collapsible light box. An apparatus includes a substantially cube-shaped structure comprising a top side, a bottom side, a rear side, a left side, and a right side. An inside of the structure is accessible through a front side of the structure, which is open. An apparatus includes one or more lighting elements disposed within the structure that illuminate the inside of the structure. An apparatus includes one or more joints located on each of the right side and the left side of the structure. The one or more joints allow the structure to collapse into a substantially flat shape.

24 Claims, 10 Drawing Sheets

(56) References Cited

U.S. PATENT DOCUMENTS

| | | | |
|---|---|---|---|
| 2008/0079906 A1* | 4/2008 | Finn | F21S 2/005 353/53 |
| 2008/0169923 A1* | 7/2008 | Belden | A47F 7/024 340/568.3 |
| 2008/0189188 A1 | 8/2008 | Morgenstern | |
| 2010/0083170 A1 | 4/2010 | Lim et al. | |
| 2011/0296294 A1 | 12/2011 | Bhadury et al. | |
| 2011/0317394 A1 | 12/2011 | Van Campen | |
| 2012/0023669 A1 | 2/2012 | Graller et al. | |
| 2012/0087643 A1* | 4/2012 | Paramadilok | E04H 1/125 396/2 |
| 2012/0290979 A1 | 11/2012 | Devecka | |
| 2013/0035995 A1 | 2/2013 | Patterson et al. | |
| 2013/0346172 A1 | 12/2013 | Wu | |
| 2014/0101197 A1 | 4/2014 | Charytoniuk | |
| 2014/0122201 A1 | 5/2014 | Johnson | |

\* cited by examiner

COLLAPSIBLE LIGHT BOX

CROSS-REFERENCES TO RELATED APPLICATIONS

This application claims the benefit of U.S. Provisional Patent Application No. 62/016,521 entitled "COLLAPSIBLE LIGHT BOX" and filed on Jun. 24, 2014 for Aaron Johnson, which is incorporated herein by reference. This application also claims the benefit of U.S. Provisional Patent Application No. 62/114,863 entitled "COLLAPSIBLE LIGHT BOX" and filed on Feb. 11, 2015 for Aaron Johnson, which is incorporated herein by reference.

FIELD

This invention relates to photography and more particularly relates to a collapsible light box that can be used for photography.

BACKGROUND

A light box is a structure that a photographer can use to provide enhanced, directed, or diffused lighting for items within the light box, which allows the photographer to capture images of the item using different lighting effects. For example, a retailer can take images of products placed within the light box to enhance the detail of the product for an online store or product catalog. Similarly, a restaurant owner may take images of food items placed within the light box for an online or paper menu.

SUMMARY

An apparatus for a collapsible light box is disclosed. A system and method also perform the functions of the apparatus. In one embodiment, an apparatus includes a substantially cube-shaped structure comprising a top side, a bottom side, a rear side, a left side, and a right side. In certain embodiments, an inside of the structure is accessible through an open front side of the structure. The apparatus, in a further embodiment, includes one or more lighting elements disposed within the structure that illuminate the inside of the structure. The apparatus may also include one or more joints located on each of the right side and the left side of the structure. The one or more joints may allow the structure to collapse into a substantially flat shape.

In one embodiment, the one or more joints on each of the right side and the left side cause the right side and the left side of the structure to angle in towards the inside of the structure when the structure is in an un-collapsed position. In another embodiment, the one or more joints on each of the right side and the left side comprise one or more hinges. In various embodiments, the one or more hinges comprise one or more extrusion hinges.

In a further embodiment, the apparatus includes one or more openings located on the top side. In certain embodiments, a size of each of the one or more openings is adjustable. In one embodiment, the rear side is coupled to the top side by a joint. The rear side may include one or more openings configured to receive one or more guide members coupled to the bottom side such that the guide members are disposed within the one or more openings to secure the rear side to the bottom side when the structure is in an un-collapsed position.

In one embodiment, each of the right side and the left side comprise one or more notches disposed along an edge of the right side and the left side configured to receive an edge of the back side such that the right side and the left side are secured against the back side. The structure, in another embodiment, is manufactured of plastic using a thermoforming and/or injection-molding process.

A system in one embodiment, includes a power supply and a substantially cube-shaped structure comprising a top side, a bottom side, a rear side, a left side, and a right side. In certain embodiments, an inside of the structure is accessible through an open front side of the structure. The system, in a further embodiment, includes one or more lighting elements disposed within the structure that illuminate the inside of the structure. The system may also include one or more joints located on each of the right side and the left side of the structure. The one or more joints may allow the structure to collapse into a substantially flat shape.

In one embodiment, the power supply comprises a battery and/or a solar panel. In a further embodiment, the system includes one or more interchangeable plates configured to be disposed on an interior face of one of the right side and the left side. The interchangeable plates may modify an effect of an illumination of the one or more lighting elements within the structure. In certain embodiments, the system includes a lighting controller configured to control one or more of a brightness, an intensity, a color, and a blinking rate of the one or more lighting elements.

In one embodiment, the system includes one or more interchangeable lighting filters configured to be disposed on one or more lighting elements. The one or more lighting elements may comprise one or more of a strip of light emitting diodes, a black light, and an ultra-violet light. In one embodiment, the system includes a slot located beneath the bottom side configured to receive a magnetic sheet such that magnetic items placed within the structure are secured to the bottom side.

In some embodiments, the system includes a platform configured to attach to an opening located on the top side and disposed perpendicular to a front of the structure such that objects within the structure are visible to a camera placed on the platform. In a further embodiment, the platform comprises one or more lighting elements disposed along a back side of the platform and directed at the inside of the structure. In one embodiment, the system includes a hood configured to attach to the structure and extend a linear length of the bottom side of the structure from a front of the structure. The hood may cover an opening where the front side is removed to prevent light from entering the structure from the front of the structure.

In some embodiments, the system includes a stand configured to be disposed on the bottom side within the structure. The bottom side may comprise one or more openings configured to receive the stand. One or more objects may be placed on the stand within the structure. The system, in another embodiment, includes a mechanism configured to un-collapse and collapse the structure without any intervention by a user. In a further embodiment, the system includes a backdrop placed within the structure that includes a background for an object within the structure.

In one embodiment, a method includes providing a light box that includes a power supply and a substantially cube-shaped structure comprising a top side, a bottom side, a rear side, a left side, and a right side. In certain embodiments, an inside of the structure is accessible through an open front side of the structure. The light box, in a further embodiment, includes one or more lighting elements disposed within the structure that illuminate the inside of the structure. The light box may also include one or more joints located on each of the right side and the left side of the structure. The one or more joints may allow the structure to collapse into a substantially flat shape.

The method, in a further embodiment, includes un-collapsing the light box. In one embodiment, the method includes activating the one or more lighting elements of the light box. In another embodiment, the method includes placing an object within the light box and capturing one or more images of the object.

The method, in a further embodiment, includes collapsing the light box into a substantially flat shape. In one embodiment, the one or more images of the object are captured from one of an opening in the top side of the light box and a front of the light box. In a further embodiment, the method includes disposing a plate on an interior face of one of the right side and the left side. The plate may change an effect of an illumination of the one or more lighting elements within the light box.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
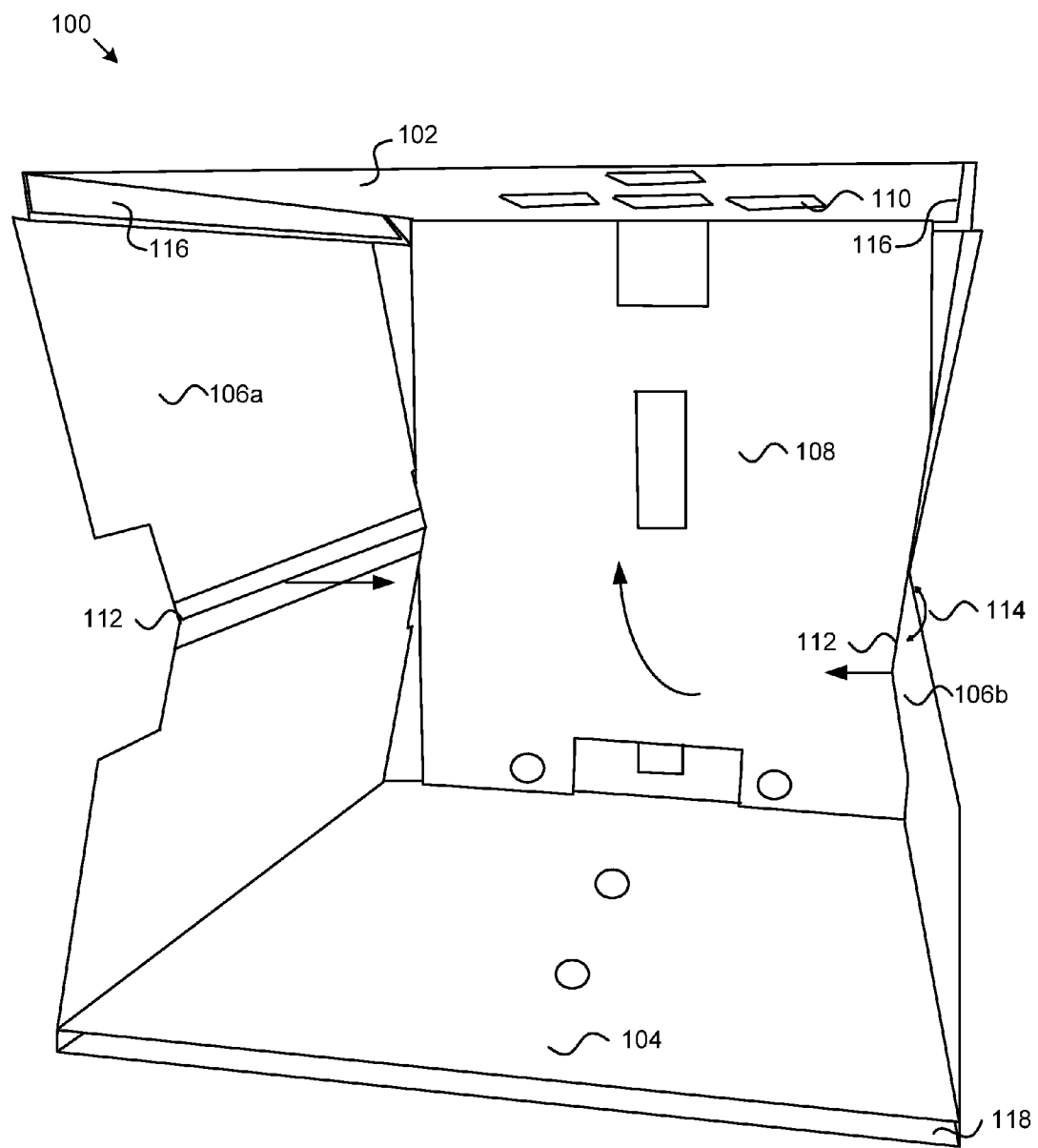
FIG. 1A is a perspective view of a collapsible light box in accordance with the subject matter presented herein.

FIG. 1A depicts a perspective view of a collapsible light box 100 in accordance with the subject matter described herein. As described herein, a light box is an apparatus or structure that provides lighting, such as diffused lighting, and a background against which to place an object for photography. A light box may allow a photographer to take images of objects that require distinct lighting to allow details of the object to stand-out or be seen more prominently. In certain embodiments, the light box 100 described herein may be utilized as a home scanner/digitizer for archiving, scrapbooking, photography, marketing, e-commerce, or the like, by using a camera or a smart device, such as a smart phone, tablet computer, or the like, that has an integrated camera to capture images of objects within the light box 100.

When not in use, the light box 100 of the present disclosure may be collapsed for easy storage, transport, or the like. For example, the light box 100 may collapse to be placed in a storage bag. The storage bag may also be large enough to contain one or more attachments for the light box 100, described below. Further, the light box 100 may include securing mechanisms, such as magnets or hook-and-loop mechanisms, which hold and secure the light box 100 in a collapsed position.

The light box 100, in some embodiments, comprises a substantially cube- or box-like shape that has a top side 102, a bottom side 104, a right side 106a, a left side 106b, and a rear side 108. In one embodiment, the light box 100, when un-collapsed, comprises an "hour glass" shape such that the sides 106 of the light box 100 angle in towards the inside of the light box 100 at a particular angle. In certain embodiments, the "hour glass" shape of the light box 100 diffuses light within the light box 100 based on the angle 114 at which the sides bend in towards the inside of the light box 100, which may focus the light on an object within the light box 100 and decrease "dazzle" or glare within the light box 100. In a further embodiment, the light box 100 may have a substantially trapezoidal or "volcano" shape where the width of the top side 102 is shorter than the width of the bottom side 104.

In some embodiments, the angle at which the sides 106 of the light box 100 angle in towards the inside of the light box 100 may be adjustable by setting the cut-outs 422 at different positions in the back side 108, described below with reference to FIG. 4B. For example, the cut-outs 422 in the sides 106 may sit in various notches cut into the edge of the back side 108 that allow the sides 106 to angle in at various angles. By adjusting the angle that the sides 106 angle in, different diffused lighting effects can be created within the light box 100.

In certain embodiments, the inside of the light box 100 is accessible through an open front side of the light box 100. In some embodiments, the light box 100 comprises a removable front side, which provides access to the inside of the light box 100 (for example, to place objects inside the box, to take perspective photographs of the items in the box, or the like). The removable front side, in certain embodiments, may be replaced before capturing images of an object placed in the light box 100 in order to block external light from entering the light box 100.

In one embodiment, the light box 100 is composed of a substantially rigid material, such as wood, composite wood, plastic, metal, bamboo, high-strength cardboard, or the like. In some embodiments, the light box 100 is manufactured of plastic using a thermoforming process, an injection mold process, or the like. In certain embodiments, the light box 100 is large enough to accommodate documents, objects, etc., of various sizes and shapes. For example, the light box 100 may have dimensions (L×W×H) of 13"×13"×15", 12"×12"×13", or the like.

In some embodiments, the sides 102-108 of the light box 100 are separate pieces that are connected using flexible joints, such as hinges, interlocking mechanisms, or the like. In one embodiment, the sides 102-108 of the light box 100 are comprised of a single piece of material that is foldable or otherwise configured to un-collapse into the light box 100. The sides 102-108 of the light box 100, in some embodiments, are removable, interchangeable, or the like. In one embodiment, the sides 102-108 include various colors, backgrounds, textures, and/or the like, which may be customized to achieve different lighting effects, background effects, or the like.

In some embodiments, the inner surfaces of the sides 102-108 may include channels, grooves, slots, or the like, to receive interchangeable plates, faces, inserts, or the like. For example, the left and right sides 106a-b may include grooves or channels that receive different plates or faces that have different colors, backgrounds, textures, and/or the like to modify the effect of the illumination within the light box 100. In another embodiment, the interchangeable plates may include lighting elements that are activated in addition to, or in place of, the lighting elements 116 of the light box 100. In such an embodiment, the interchangeable plates may include contact points that correspond to contact points on the light box 100 and provide power from the power supply of the light box 100 to the lighting elements on the interchangeable plates.

Figure 10:
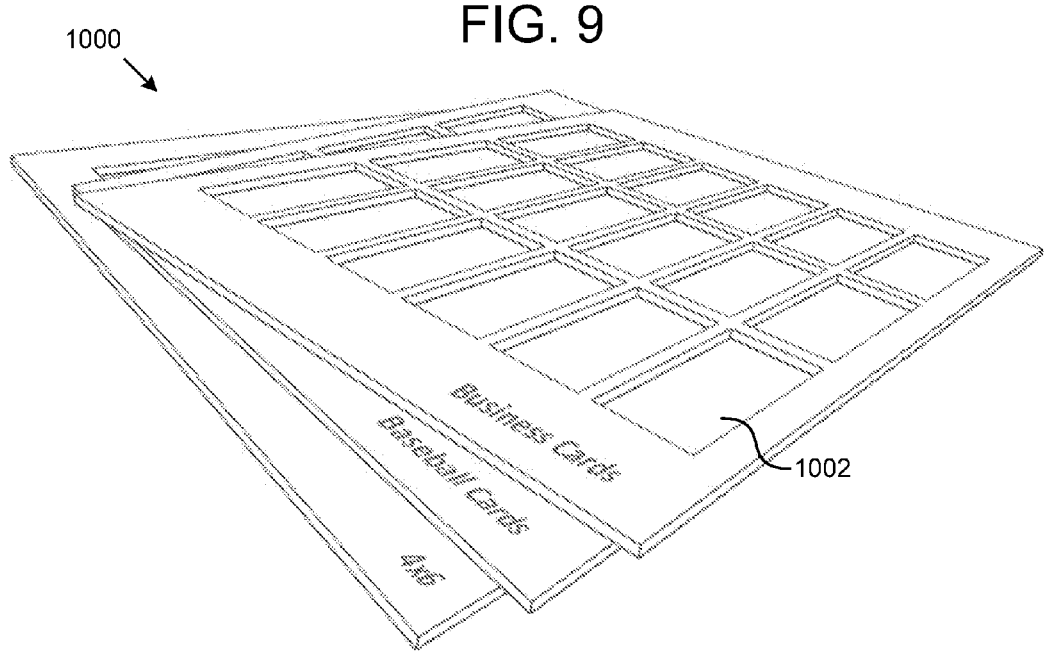
FIG. 10 is a perspective view of various guide trays for a collapsible light box in accordance with the subject matter presented herein.

Similarly, the bottom side 104 may include grooves, channels, or slots configured to receive inserts for the bottom surface. For example, the bottom side 104 may include grooves for receiving inserts with different backgrounds, colors, textures, and/or the like. Similarly, the bottom layer inserts may include design inserts that configure, organize, arrange, or layout the objects, images, documents, or the like in the light box 100. For example, an insert may include a "baseball card" insert, as depicted in FIG. 10, which allows a user to place different images within the slots of the insert and take an image of the layout.

In one embodiment, the top side 102 includes one or more openings 110 that may be used to take an image of an object inside the light box 100 from the top side 102. In certain embodiments, a camera may be used to capture an image of an object inside the light box 100, such as a film camera (e.g., a traditional film camera that uses 35 mm film), a digital camera, a smart phone camera, a tablet computer camera, a smart watch, an optical head-mounted display, or the like though the one or more openings 110. The openings 110 may be located in various positions along the top side 102.

In one embodiment, the openings 110 are all the same size. In certain embodiments, one or more of the openings 110 are different sizes. In some embodiments, the sizes of the openings 110 are adjustable to accommodate a variety of camera shapes and sizes. In one embodiment, the openings 110 include a height-adjustable mechanism that allows a user to adjust the height of a camera in relation to an opening 110. By including multiple openings 110, a user may select an appropriate angle to take a picture of an object in the light box 100 to reduce glare, capture different details of an object, or the like.

In one embodiment, the light box 100 includes covers for the openings 110. A cover may include an insert that is inserted into an opening 110 to block light from entering the opening. In some embodiments, the light box 100 includes a surface (not shown) that covers all the openings 110 at the same time. Such a cover may be attached to one of the sides 102-108 by a hinge and may be placed over the top side 102 to block light from entering the light box 100 through the openings 110. In a further embodiment, the light box 100 includes slideable covers that are built into the top side 102 and may be selectively opened and closed by sliding the cover open and closed. In certain embodiments, the one or more openings 110 may be used to lift and setup the light box 100 in an un-collapsed state in such a manner that a user does not pinch his fingers while preparing the light box 100 for use.

In one embodiment, an object is placed on the bottom side 104 of the light box 100. The bottom side 104 may include different background colors, such as black, white, grey, red, blue, or the like, to accommodate a photographer's preferences. In certain embodiments, as described above, the backgrounds comprise interchangeable inserts that may be inserted in the bottom side 104. For example, a photographer may insert a black surface background for some objects and a white surface background for other objects. In similar embodiments, the back side 108 may also include interchangeable background inserts, which may be useful for capturing images taken from the front side (e.g., the removed side) of the light box 100. In such an embodiment, the background inserts may create an "infinity corner" such that the rigid or hard corners of the light box 100 are not visible (because the rigid corners are covered by the background insert).

In some embodiments, the bottom side 104 (or any of the other sides 102, 106a-b, 108) includes a color strip that may be used to calibrate a camera being used to capture images of the object inside the light box 100. In a further embodiment, the bottom side 104 includes feet (not shown) attached to the underside of the bottom side 104 that support the light box 100. In some embodiments, when the light box 100 is in a collapsed state, wires for the electrical components of the light box 100 (e.g., the lighting elements 116 (described below), the USB ports (described below), or the like), may be wrapped around the feet to easily and cleanly store or transport the light box 100.

In certain embodiments, the light box 100 may be used to digitize pages of various types of books without unbinding the books. In one embodiment, the bottom side 104 includes a transparent plate or glass (not shown) that may be placed over the pages of an open book, a plurality of photos spread out within the light box 100, one or more documents, or the like, in order to flatten the objects within the light box 100. The transparent plate may be manufactured of glass, plastic, Plexiglas®, or the like, and may be heavy enough to hold down and flatten the pages of a book. The transparent plate, in such an embodiment, may be attached to a side 102-108 of the light box 100, by a hinge or the like, or may be a separate piece that may be selectively used and removed by the user. Other means for securing pages of an open book may include magnets, weights, or the like. In a further embodiment, the light box 100 may include supports that can be inserted on the bottom side 100 to hold a book open at various angles.

In a further embodiment, the bottom side 104 may include a turntable (not shown), which may be used in conjunction with a photo attachment described below. An object may be placed in the light box 100 on the turntable such that multiple different images of the product may be captured. In some embodiments, the turntable may be in communication with a device that is capturing the images, such as a smart phone. For example, the turntable may be in communication with a smart phone via a Bluetooth® connection, a Wi-Fi connection, a near-field communication (NFC), or the like network. The smart phone, in such an embodiment, may control various functions of the turntable, such as turning the turntable on and off, adjusting the rotational speed and/or direction of the turntable, or the like.

In some embodiments, the left and right sides 106a-b are collapsible such that the light box 100 can be collapsed to a substantially flat shape. In one embodiment, the left and right sides 106a-b include one or more sets of hinges 112 that allow a left and/or right side 106a-b to collapse in on itself. The hinges 112 may include butt hinges, butterfly hinges, flush hinges, piano hinges, resistance hinges, extrusion hinges, or the like. In one embodiment, the hinges 112 may lock in place when the light box 100 is not collapsed. In some embodiments, a left and/or right side 106a-b may include a crease or fold that allows a left and/or right side 106a-b to fold in on itself instead of using hinges 112.

In certain embodiments, the left and/or right sides 106a-b are disposed at an angle 114 when the light box 100 is uncollapsed such that the left and/or right sides 106a-b can only bend or fold in towards the center of the light box 100 and not in the opposite direction. In certain embodiments, the left and/or right sides 106a-b are disposed at about an eight degree angle when the light box 100 is in an un-collapsed state. In this manner, the left and/or right sides 106a-b are prevented from bending in an outward direction and unintentionally collapsing the light box 100.

In a further embodiment, the left and/or right sides 106a-b fold in on one another such that the left and/or right sides 106a-b lay substantially flat on one another. For example, a left side 106a may not include a hinge 112 in the middle of the left side 106a, but only at the bottom of the left side 106a that connects the left side 106a to the bottom side 104. When the light box 100 is collapsed, the left side 106a may lay directly on the bottom side 104 and the right side 106b may lay on the left side 106a, then the back side 108 and the top side 102 may lay flat on the left and/or right sides 106a-b. In such an embodiment, the left and/or right sides 106a-b may substantially support the top side 102.

Figure 3:
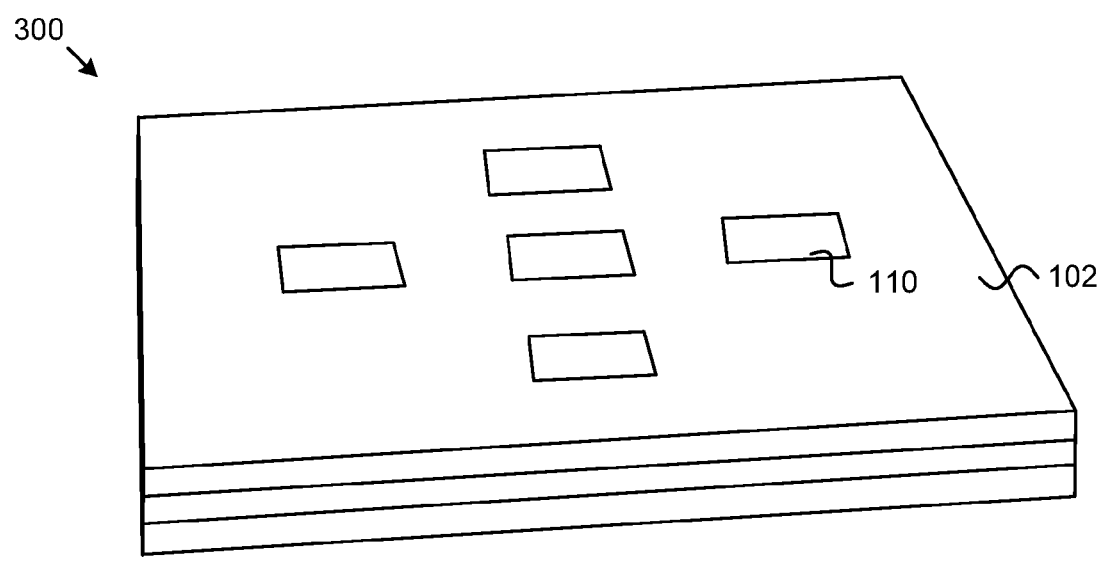
FIG. 3 is a top view of a collapsed light box in accordance with the subject matter presented herein.

In one embodiment, the back side 108 is connected to the top side 102 using a hinge 112, a crease, or other flexible mechanism. Alternatively, the back side 108 may be connected to the bottom side 104 using a hinge 112 or the like. The back side 108, when the light box 100 is not collapsed, provides support for the top side 102. In certain embodiments, the back side 108, when not collapsed, locks into the bottom side 104 in order to prevent the back side 108 from inadvertently collapsing. For example, the back side 108 may connect to the bottom side 104 using a tongue and groove mechanism, magnets, snaps, a hook-and-loop mechanism, or the like. In one embodiment, the light box 100 is collapsed by folding the back side 108 in to the top side 102 such that the back side 108 lays substantially flat against the top side 102. The left and right sides 106a-b may then be collapsed to allow the light box 100 to lay substantially flat, as depicted in FIG. 3.

In some embodiments, the light box 100 may include a mechanism configured to un-collapse and collapse the structure without any intervention by a user. For example, the light box 100 may include a mechanism connected to the hinges 112 that causes the hinges 112 to open or close and un-collapse or collapse the light box 100. The mechanism may be controlled using an application on a smart phone in communication with the mechanism or light box 100 via a Bluetooth® connection, an IR connection, or the like.

In one embodiment, the light box 100 includes one or more lighting elements 116 that illuminate the light box 100. In certain embodiments, the lighting elements 116 include strips of LED lights of various colors, incandescent lights, fluorescent lights, neon lights, ultra-violet lights, black lights, or the like. The lighting elements 116 may be permanently attached to the light box 100 such that the lighting elements 116 remain attached to the light box 100 when the light box 100 is in a collapsed state. In some embodiments, the lighting elements 116 may be selectively coupled to the light box 100 such that the lighting elements 116 may be removed, or interchanged, from the light box 100.

In one embodiment, the light box 100 includes a lighting controller that controls a brightness, an intensity, a color, a blinking rate, or the like of the lighting elements 116. The lighting controller, for example, may include a dimmer to adjust the brightness of lighting elements 116. The lighting controller may be controlled by a user or may automatically control different settings of the lighting elements 116. For example, the lighting controller may set a brightness of the lighting elements 116 based on a brightness of the lighting external to the light box 100. In certain embodiments, the lighting elements 116 are turned on and off automatically based on the state of the light box 100, e.g., the lighting elements 116 may be turned on when the light box 100 is set up and/or the lighting elements 116 may be turned off when the light box 100 is collapsed.

In some embodiments, the light box 100 may be enabled with Bluetooth®, an IR receiver, or a similar short-range communication protocol, that allows a device to communicate with the light box 100. For example, a Bluetooth®-enabled device may include an application that allows a user to control different characteristics of the lighting elements 116, such as the brightness, color, and/or intensity of the lighting elements 116.

In certain embodiments, the lighting elements 116 are attached to the top side 102 of the light box 100. For example, the lighting elements 116 may be attached to an extrusion hinge, described below with reference to FIG. 8, which couples the top side 102 to one of the left and right sides 106a-b. In further embodiments, the lighting elements 116 are attached to any side 102-108 of the light box 100, and any number of lighting elements 116 may be included.

In some embodiments, the lighting elements 116 are interchangeable or replaceable, which allows different types of lighting elements 116, lighting elements 116 of different colors, replacement lighting elements 116, or the like to be installed in the light box 100. In one embodiment, the lighting elements 116 may be selectively turned on and off. For example, if the light box 100 includes a plurality of lighting elements 116, all the lighting elements 116 may be turned on or off together, or each lighting element 116 may be turned on or off independently of other lighting elements 116.

In some embodiments, the lighting elements 116 include interchangeable covers, filters, or the like that may be placed over the lighting elements 116 to provide different lighting effects for the light box 100. For example, the filters may change the color, an intensity, a brightness, or the like of the lighting elements 116. The light box 100 may include reflection points attached to one or more of the inner surfaces of the sides 102-108 of the light box 100, which may also provide different lighting effects by reflecting the light at different locations, angles, or the like.

In one embodiment, the lighting elements 116 are attached to the sides 102-108 of the light box 100 at specific positions or angles to achieve different lighting effects. For example, the lighting elements 116 may be positioned within the light box 100 such that the angle of the light does not generate glare on an object within the light box 100. For example, if the light box 100 is being used to digitize scrapbook pages that are contained within a plastic sleeve, the lighting elements 116 may be attached to the sides 102-108 of the light box 100 at locations that reduce or remove glare produced by the light reflecting off of the plastic sleeve. In this manner, it is not necessary to remove scrapbook pages, photos, documents, or the like, from their protective sleeves. In some embodiments, the angle of the position of the lighting elements 116 can be adjusted.

In one embodiment, the light box 100 includes a slot, drawer, or the like 118 located on the underside of the bottom side 104. In one embodiment, the slot 118 may include a storage drawer, or the like, which may be used to store accessories for the light box 100, such as interchangeable plates for the inner surfaces of the sides 102-108, filters for the lighting elements 116, or the like. In some embodiments, the slot 118 may house a metal/magnetic sheet, plate, insert, or the like that allows magnetic items placed in the light box 100 to be secured to the bottom side 104 by the magnetic pull between the object and the metal sheet. In another embodiment, the magnetic sheet may be placed within the light box 100 resting on the bottom side 104. For example, magnetic buttons or weights may be used to hold down corners of an open book while a user captures an image of the pages of the book. In one embodiment, the slot may include an extender configured to extend out from the front of the light box 100 to increase the length of the bottom side 108.

The light box 100, in some embodiments, includes a power supply (not shown) to power the lighting elements 116, a camera, a smart device, or the like. For example, the power supply may include one or more batteries (e.g., 9 volt, 12 volt, double-A, triple-A, or the like) that power the lighting elements 116. In another example, the power supply may include solar panels, or the like, such that power for the light box 100 may be derived from solar energy. In yet another embodiment, the power supply may be an external battery pack that plugs into the light box 100 and/or one or more of the lighting elements 116.

In some embodiments, the light box 100 includes a plug-in power supply, such as an AC plug for an AC socket, a 5V power port for power supplies that provide 5V power (such as a battery pack, a computer port, or the like), or the like. The lighting elements 116 may also include a separate power supply, such as a battery that powers each lighting element 116 separately. In some embodiments, the light box 100 may be comprised of transparent material that allows external light to shine into the box 100 from the outside. The lighting elements 116 may be placed on the outside of the box 100, in such an embodiment, and shine through the left and/or right sides 106a-b, the back side 108, and/or the top side 102 to illuminate an object within the box 100.

In a further embodiment, the light box 100 includes a power supply connector for a device that is being used to take images of an object within the light box 100. For example, the light box 100 may include one or more USB ports to provide power to a smart phone, camera, or the like. Other connections may be used such as a 30-pin connector, an 8-pin connector, and/or any other connector that provides power to a camera or a smart device with a camera. In this manner, by integrating lighting elements 116 and a power supply, the collapsible light box 100 is a self-contained and portable light box 100.

Figure 1B:
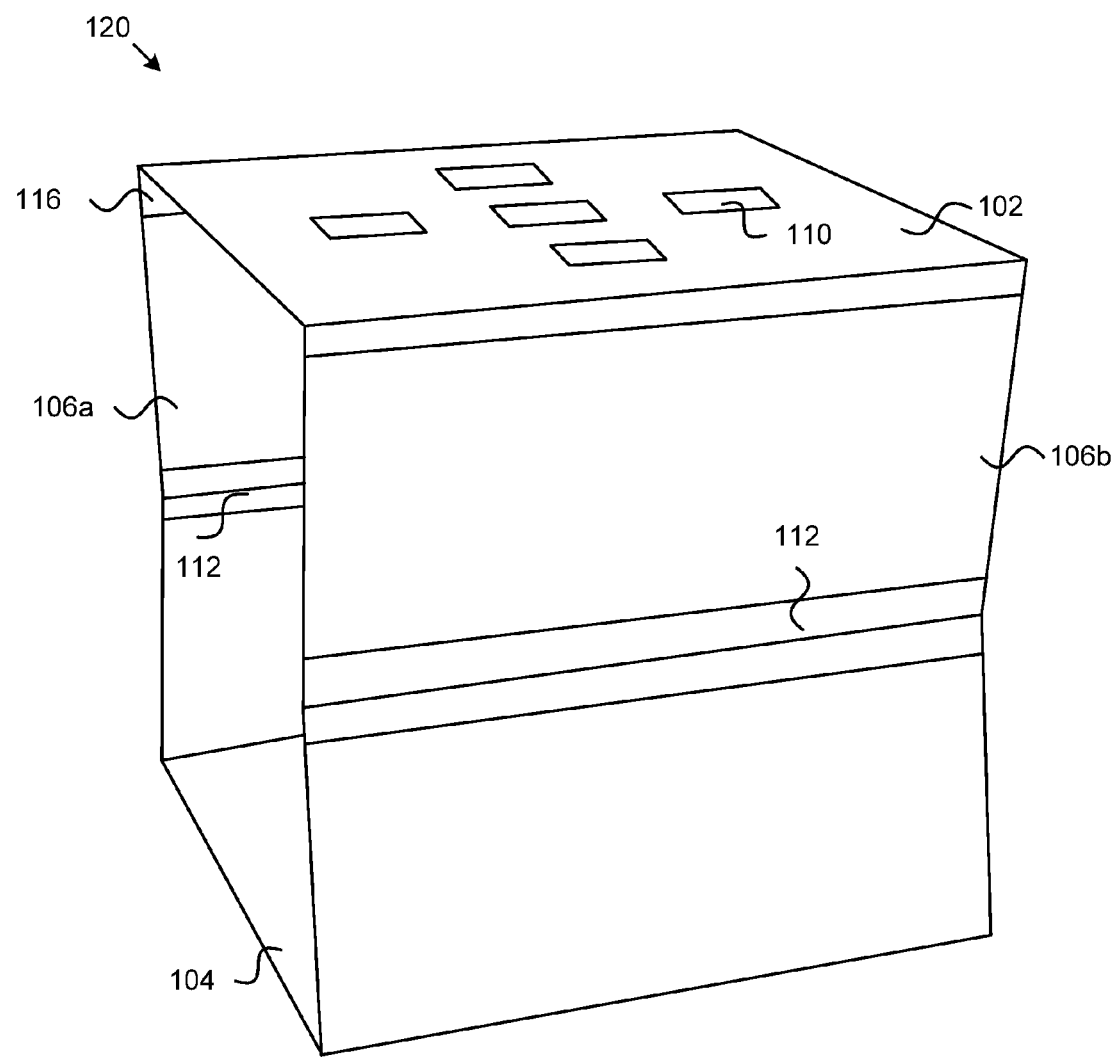
FIG. 1B is a side view of a collapsible light box in accordance with the subject matter presented herein.

FIG. 1B is a side view of a collapsible light box 120 in accordance with subject matter disclosed herein. In one embodiment, the collapsible light box 120 is substantially similar to the light box 100 depicted in FIG. 1A. As depicted in FIG. 1B, a light box 120 may include collapsible left and right sides 106a-b that collapse in on themselves using one or more hinge mechanisms 112, such as a piano hinge, extrusion hinge, or the like. The left and right sides 106a-b may also be connected to a top side 102 and a bottom side 104 using a hinge mechanism 112 to allow the left and right sides 106a-b to fold inward and collapse in on themselves such that the light box 120 may collapse to a substantially flat state.

Figure 2:
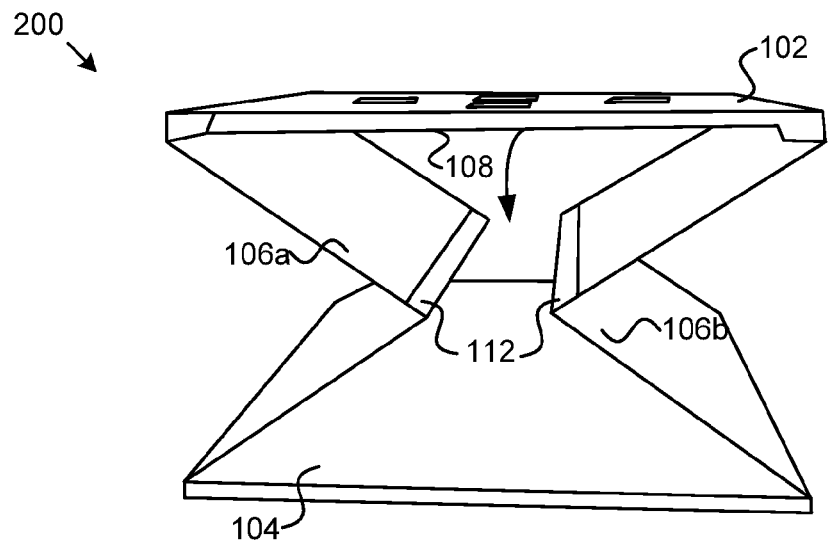
FIG. 2 is a perspective view of a collapsible light box being collapsed or un-collapsed in accordance with the subject matter presented herein.

FIG. 2 is a perspective view of a light box 200 that is being collapsed or assembled. The light box 200 may be substantially similar to the light box 100 depicted in FIG. 1A. In one embodiment, the left and right sides 106a-b of the light box 200 fold inward and/or outward, depending on whether the light is being collapsed or assembled. The left and right sides 106a-b, as described above, include hinges 112 that allow the sides 106 to fold in or out. When being assembled, the back side 108 may fold down and lock into the bottom side 104 to support the light box 200 in an upright, assembled position. When being collapsed, the back side 108 folds against the top side 102 and the left and right sides 106a-b of the light box 200 collapse, which allows the light box 200 to lay substantially flat, as shown in FIG. 3. In certain embodiments, the light box 200 includes a mechanism that collapses and un-collapses the light box 200 without any intervention by the user. For example, the hinges 112 may include a mechanism that provides enough force to open and close the hinges 112, and ultimately un-collapse or collapse the light box 200.

FIG. 3 is a top view of a collapsed light box 300 in accordance with the subject matter presented herein. The light box 300 may be substantially similar to the light box 100 depicted in FIG. 1A. In the depicted embodiment, the back side 108 and the left and right sides 106*a-b* have been collapsed to allow the light box 300 to lay substantially flat. In certain embodiments, the left and right sides 106*a-b* and the back side 108 fold into the light box 300 in order to allow the light box 100 to collapse in on itself and maintain a substantially square or rectangular shape.

In certain embodiments, the collapsed light box 300 may include a locking mechanism that maintains the light box 300 in a collapsed state. For example, the bottom side 104 may include one half of a hook and loop mechanism (such as a strap) and the top side 102 may include the other half of the hook and loop mechanism such that the two halves may be connected to hold the light box 300 in a collapsed state. Similarly, the locking mechanism may comprise one or more magnets that secure the light box 300 in a collapsed state. For example, the left and right sides 106*a-b* may each comprise magnets that attract and secure the light box 300 in a collapsed state when the left and right sides 106*a-b* are collapsed in on themselves.

In one embodiment, the collapsed light box 300 includes a handle (not shown) that is coupled to the light box 300. In some embodiments, the handle is selectively coupled to a side of the collapsed light box 300. For example, a handle may be added and removed to different sides of the collapsed light box 300 by a user. In certain embodiments, the handle may act as the locking mechanism that holds the collapsed light box 300 in a collapsed state. In a further embodiment, the handle may be built in to the light box 300. For example, the sides 102-108 may include cutouts for carrying the light box 300 when it is collapsed.

Figure 4A:
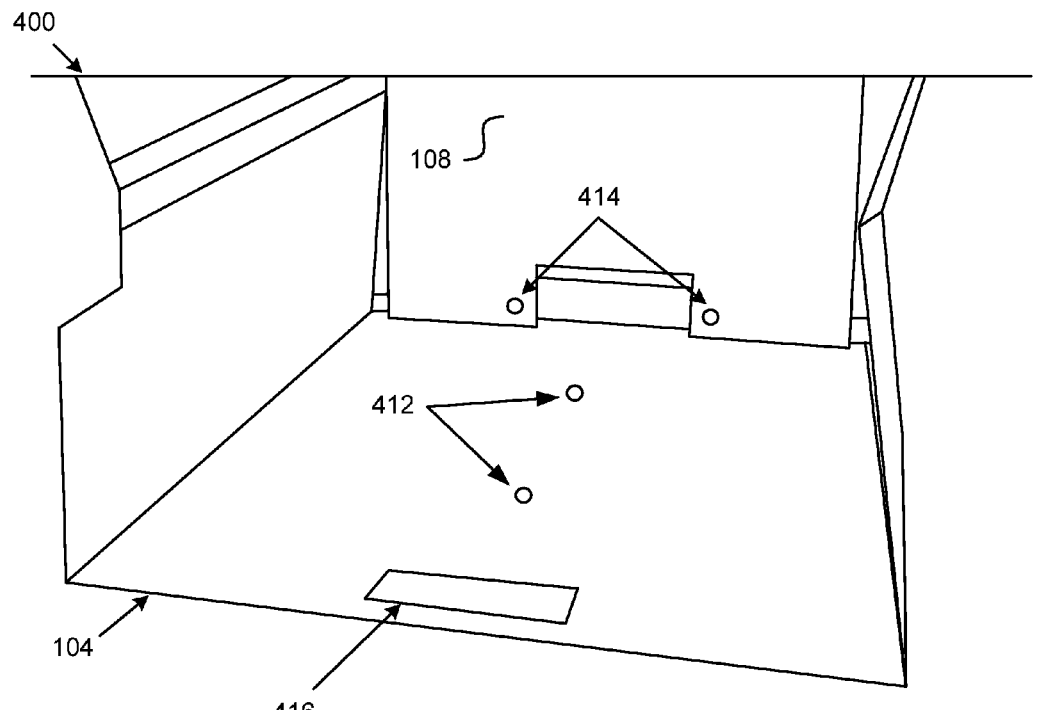
FIG. 4A is a perspective view of a collapsible light box in accordance with the subject matter presented herein.

FIG. 4A depicts a perspective view of a collapsible light box 400 in accordance with the subject matter presented herein. The light box 400 may be substantially similar to the light box 100 depicted in FIG. 1A. In one embodiment, the light box 400 includes one or more openings or holes 412 disposed on the bottom side 104 of the light box 400. In certain embodiments, the one or more holes 412 receive one or more attachments for the light box 400. For example, the one or more holes 412 may receive various pedestals, stands, turntables, or other attachments that may be used to support or accessorize objects placed within the light box 400.

In another embodiment, the one or more holes 412 may be used to secure a backdrop, panel, or the like that is used as a background for an item within the light box 400. For example, a backdrop or panel may have a width that corresponds to the width of the light box 400 and may be disposed at one end near where the top side 102 and the back side 108 meet and curve downward toward the front of the bottom side 104. In such an embodiment, the one or more holes 412 may receive one or more securing members disposed on the backdrop such that the backdrop is secured to the light box 400. The backdrop may also be secured to the bottom side 104 using magnets, snaps, weights, hook-and-loop mechanisms, an adhesive, a friction fit, or the like. The backdrop may have different colors, scenes (e.g., the beach, a house, a tree, etc.), lighting effects, or the like.

In a further embodiment, the back side 108 may comprise one or more openings or holes 414 that receive one or more guide members disposed along the rear of the light box 400. The guide members may include dowels, screws, nails, or the like, that are disposed within the one or more holes 414 of the back side 108 when the light box 410 is in an un-collapsed state. In this manner, a user may align the guide members and the holes 414 to ensure that the back side 108 is in a correct position. In certain embodiments, the back side 108 is secured in an upright position by the guide members. For example, the back side 108 may snap into the guide members using the openings 414, or a different mechanism, such as magnets, a hook-and-loop system, or the like, as is known in the art.

Figure 4B:
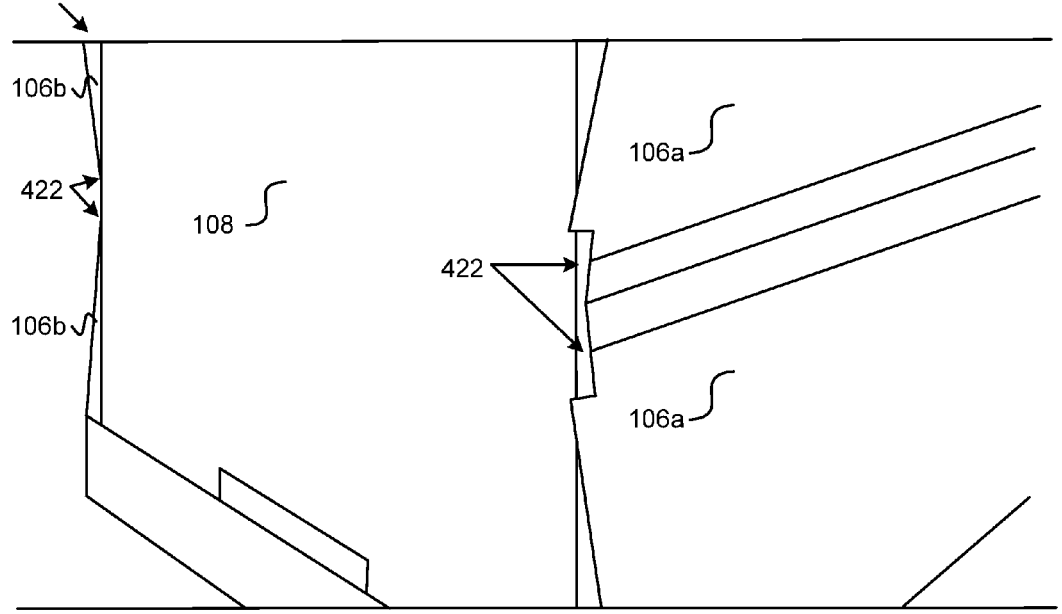
FIG. 4B is a perspective view of a collapsible light box in accordance with the subject matter presented herein.

FIG. 4B depicts another perspective view of a collapsible light box 410 in accordance with the subject matter presented herein. The light box 410 may be substantially similar to the light box 100 depicted in FIG. 1A. In one embodiment, the left and right sides 106*a-b* comprise one or more notches 422 disposed along an edge of the left and right sides 106*a-b*. The one or more notches 422 may be configured such that the left and right sides 106*a-b* are secured to the back side 108 when the light box 410 is un-collapsed. The one or more notches 422 allow the left and right sides 106*a-b* to bend inward and be situated against the back side 108 in such a way as to not bend entirely inward by resting against the back side 108.

Figure 5:
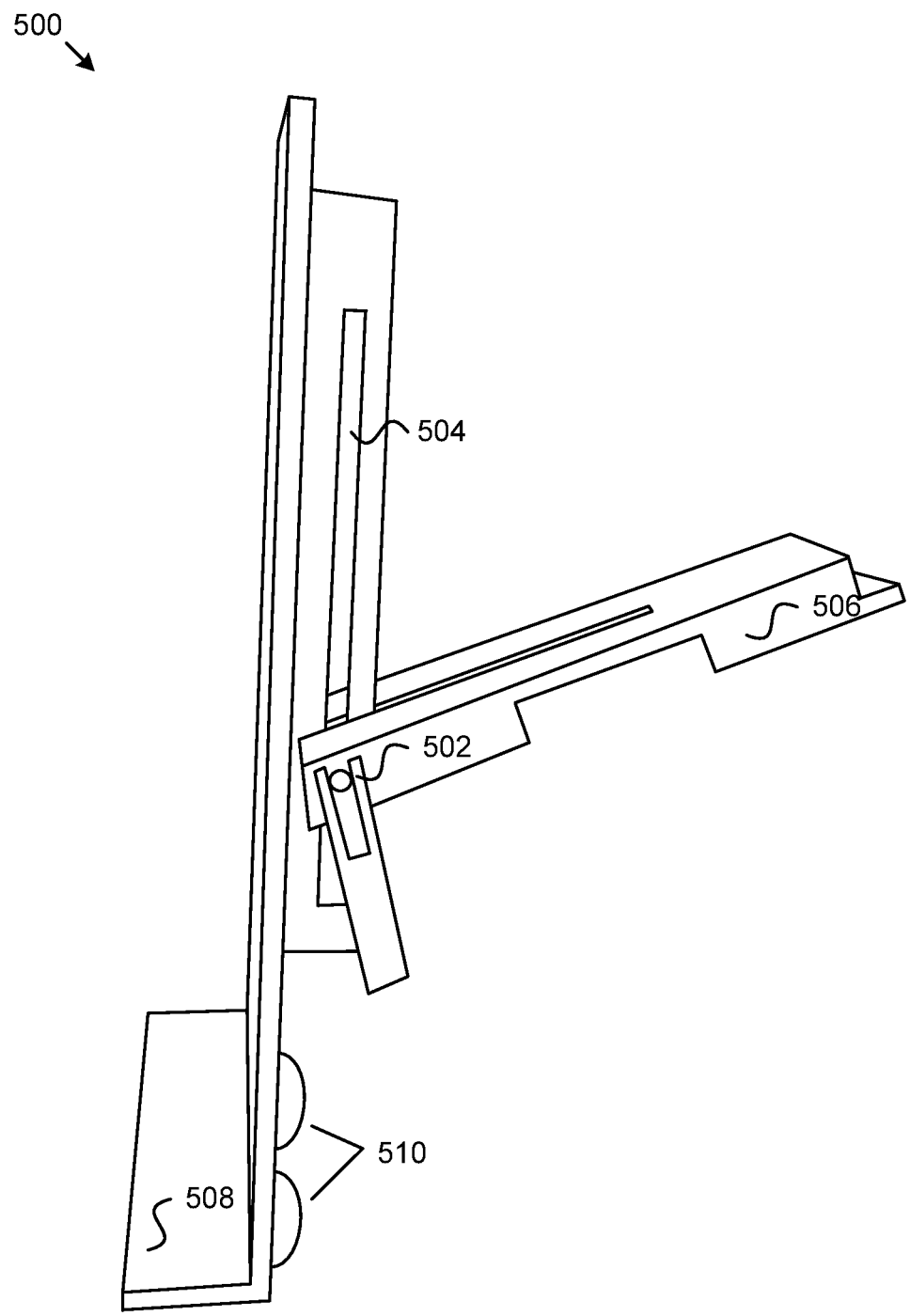
FIG. 5 is a side view of an attachment for a collapsible light box in accordance with the subject matter presented herein.

FIG. 5 is a side view of an attachment 500 for a collapsible light box 100 in accordance with the subject matter presented herein. In one embodiment, the attachment 500 attaches to the light box 100 to allow images to be taken from the front of the light box 100 (e.g., from the open or removed side of the light box 100). The attachment 500, in certain embodiments, is made of a substantially rigid material, similar to the light box 100, such as wood, plastic, metal, or the like. For example, the attachment 500 may be made of a rigid plastic material formed using a thermoforming or injection-molding process.

In the depicted embodiment, the height of the attachment 500 is adjustable by changing the position of an adjustment mechanism 502 along a grove 504 in the rear of the attachment 500. In this manner, the attachment 500 may be positioned at various heights depending on the user's preference to capture images of objects within the light box 100 from different angles. The attachment 500, in certain embodiments, attaches to an opening 110 on the top side 102 of the light box 100 using the insert member 506.

Figure 6:
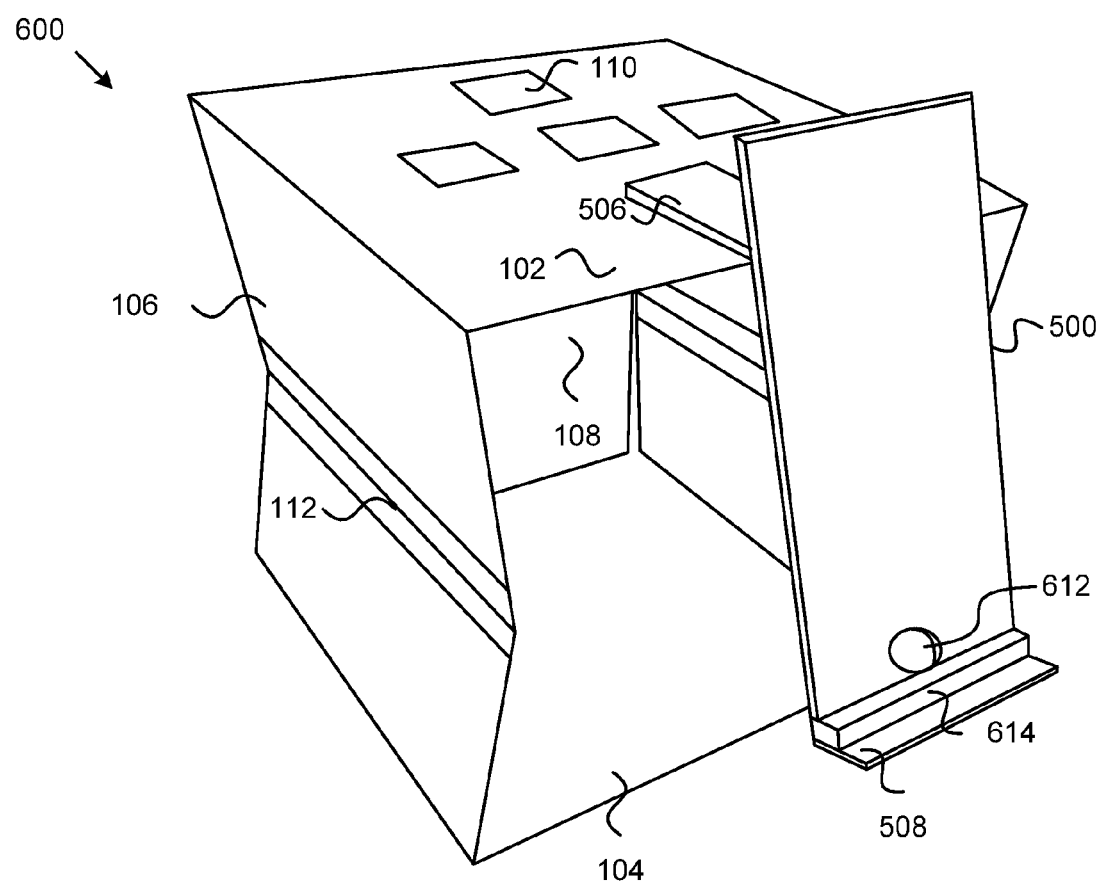
FIG. 6 is a perspective view of an attachment coupled to a collapsible light box in accordance with the subject matter presented herein.

In some embodiments, the attachment 500 includes an opening 612, shown in FIG. 6, which allows an image to be taken through the attachment 500. In certain embodiments, for example, a camera may be placed on a lip 508 or shelf 508 of the attachment 500 and orientated such that the camera can take an image of an object in the light box 100 through the opening 612 in the attachment 500. In certain embodiments, the attachment 500 may comprise multiple openings 612 located at different positions on the attachment 500. The sizes of the openings 612 may be adjustable, in some embodiments. In another embodiment, the openings may be selectively opened and closed, similar to the openings 110 on the top side 102.

In one embodiment, the attachment 500 includes lighting elements 510 located on the back side of the attachment 500. The lighting elements 510 may include LEDs, or the like, of varying brightness, intensity, color, or the like. In certain embodiments, the attachment 500 includes a switch that can be used to turn the lighting elements 510 on and off.

In some embodiments, the light box 100 may include one or more contact points (not shown) located at or near the openings 110 where the attachment 500 attaches. The attachment 500 may also include one or more corresponding contact points located on the insert member 506. The contact points on the light box 100 may be operably coupled to the power supply of the light box 100 such that when the contact points of the attachment 500 come in contact with the contact points of the light box 100, power can be directed to the attachment 500 to power the lighting elements 510, a camera device positioned on the attachment 500, or the like.

In some embodiments, the attachment 500 may include extensions that slide, fold-out, or otherwise extend out from the sides of the attachment 500 to accommodate camera devices of different sizes. For example, the attachment 500 may be large enough to support a smart phone, but not a larger tablet computer. Thus, a user may slide or position extenders from the sides of the attachment 500 to provide support for the larger tablet computer.

FIG. 6 is a perspective view of a light box 600 with an attachment 500 coupled to the light box 600 in accordance with the subject matter presented herein. In one embodiment, the attachment 500 is coupled to the light box 600 by inserting the attachable insert member 506 into an opening 110 on the top side 102 of the light box 100. A camera is placed on the shelf 508 of the attachment 500 and oriented such that the lens of a camera is facing the inside of the light box 600 through the opening 612 in the attachment 500. In some embodiments, the attachment 500 includes a height adjustable insert 614 for the shelf 508, which allows the user to adjust the height of the camera while it is on the shelf 508.

Figure 7:
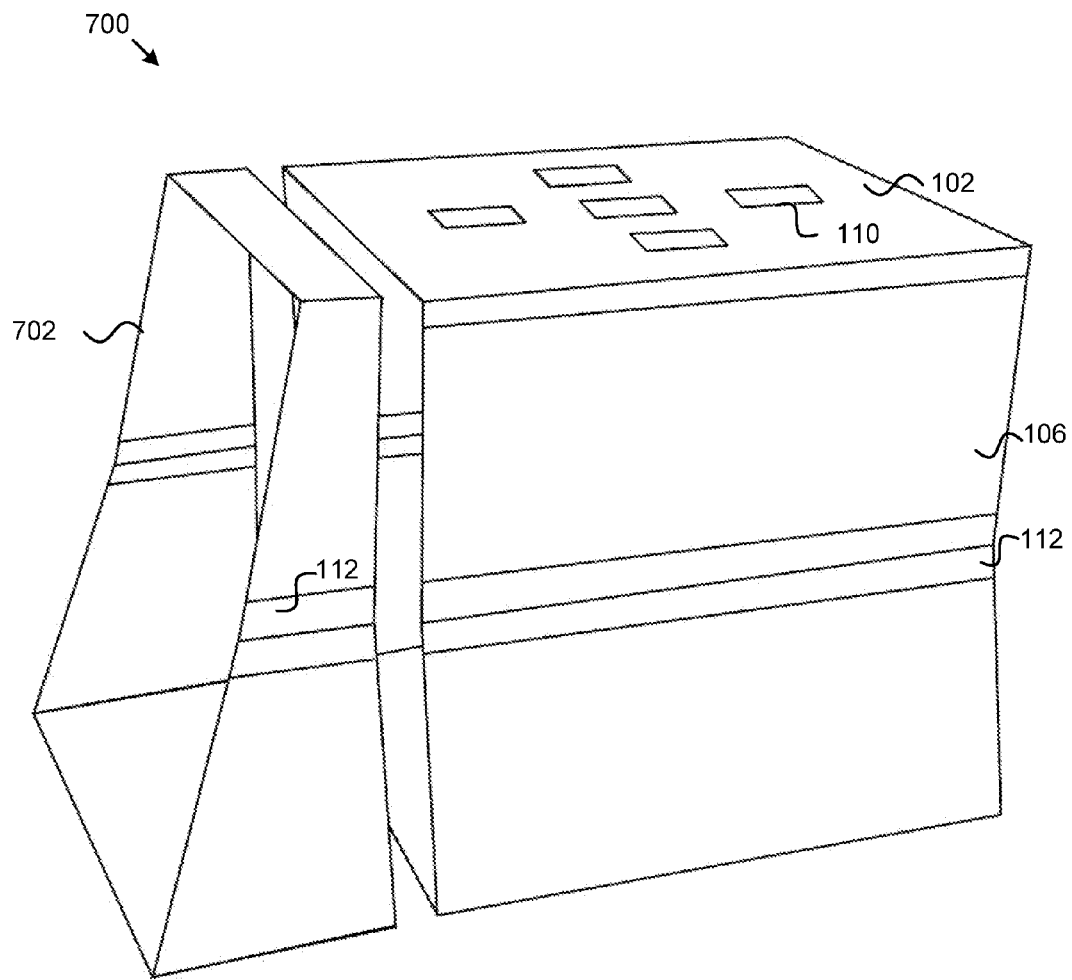
FIG. 7 is a perspective view of a hood attachment for a collapsible light box in accordance with the subject matter presented herein.

FIG. 7 depicts one embodiment of a light box 700 with a hood attachment 702. The hood attachment 702, in one embodiment, selectively attaches to the front of the light box 700 to extend the length of the bottom side 104 of the light box 700. For example, the hood attachment 702 may attach to the light box 700 using a friction fit, snaps, buttons, magnets, hook-and-loop mechanisms, or the like. In one embodiment, the hood attachment may increase the size of the light box 700 to at least 13"×19". In some embodiments, the size of the light box 700 with the hood attachment 702 will be larger or smaller than 13"×19".

The hood 702 may also include a cover (not shown) that extends from the top of the hood 702 to the bottom of the hood 702 to block light from entering the front side of the light box 700. The hood 702 may also include lighting elements and contact points that correspond to contact points located on the light box 700 such that when the contact points on the hood 702 come into contact with the contact points on the light box 700, power is directed from the power supply of the light box 700 to the lighting elements on the hood. The hood 702 may include hinges 112, similar to the hinges 112 located on the light box 700, which allows the hood 702 to be collapsed and un-collapsed.

Figure 8:
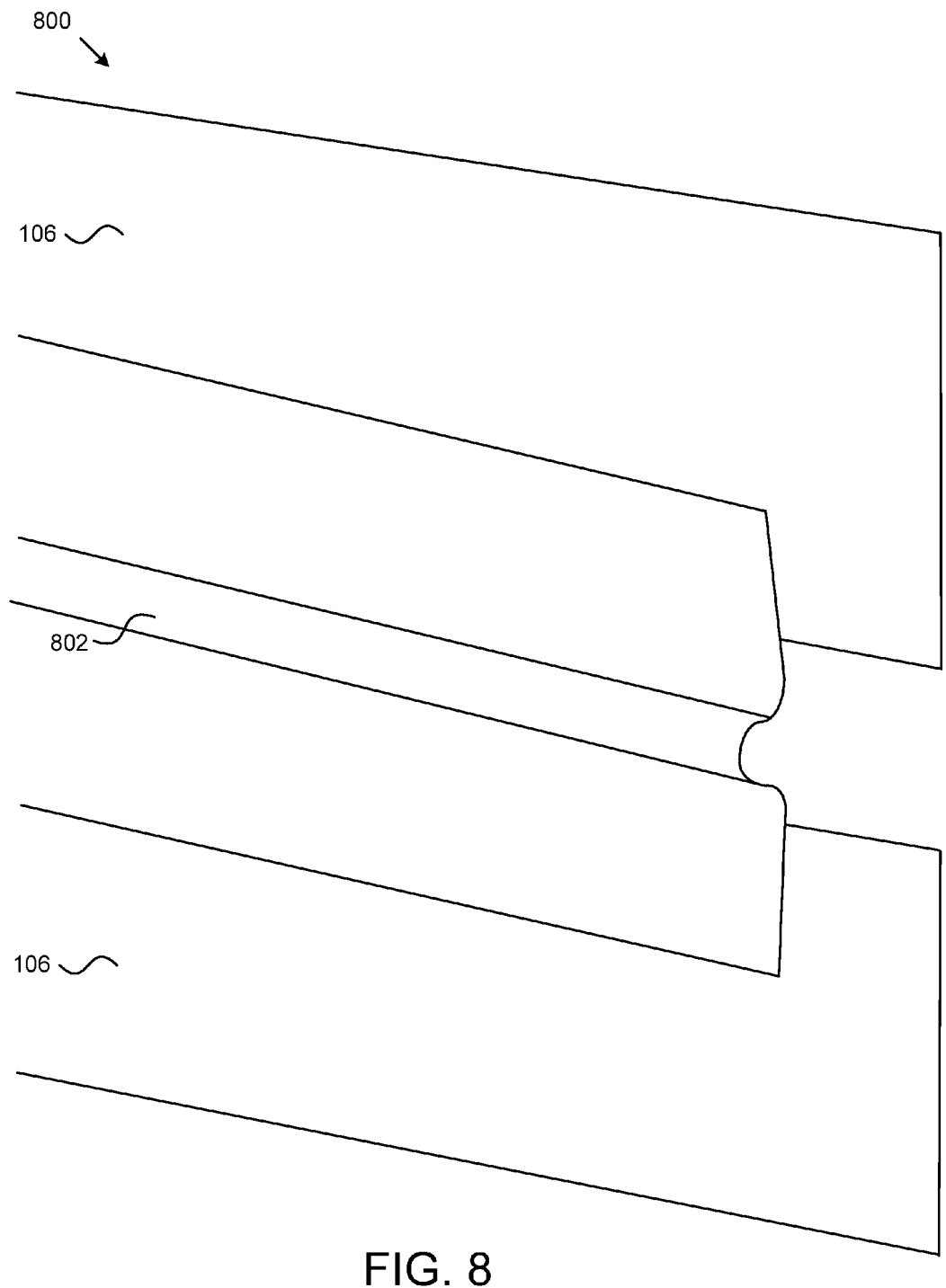
FIG. 8 is a perspective view of an extrusion hinge for a collapsible light box in accordance with the subject matter presented herein.

FIG. 8 depicts one embodiment 800 of an extrusion hinge 802. The extrusion hinge 802 may be used to hold two or more different sides 106 of the light box 100 together. The extrusion hinge 112 may be comprised of a single piece of material, such as plastic, and may be flexible enough to fold or bend, but rigid enough to support the sides of the light box 100 when the light box 100 is in an un-collapsed state. The extrusion hinge 802 may be formed of plastic using a thermoforming or injection-molding process. In certain embodiments, the extrusion hinge may be formed with inner compartments or channels that allow electrical wires, or the like, to be hidden away within the hinge 112.

Figure 9:
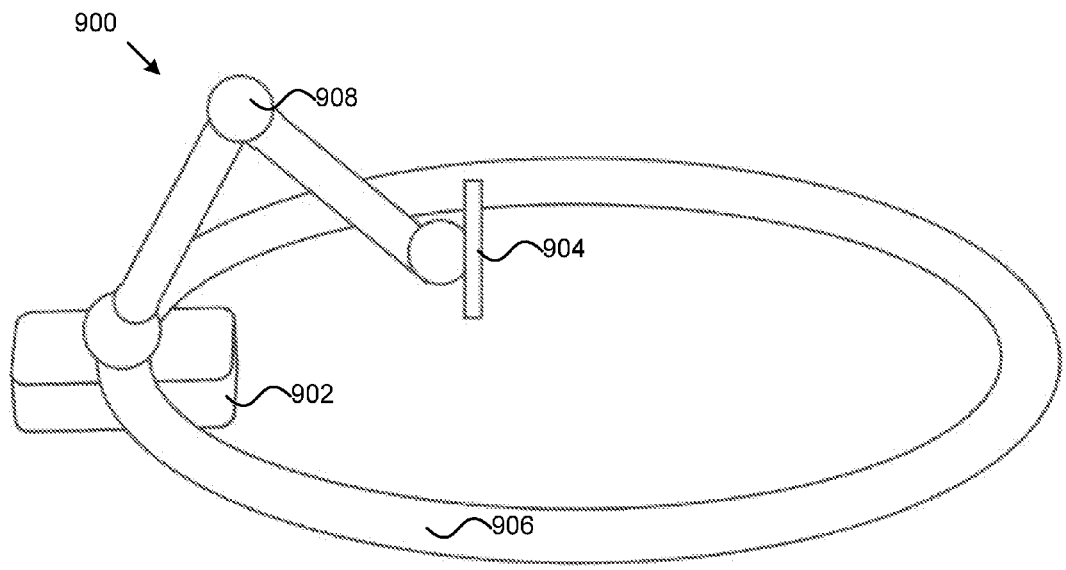
FIG. 9 is a perspective view of a camera attachment for a collapsible light box in accordance with the subject matter presented herein.

FIG. 9 depicts one embodiment of a camera attachment 900 for a light box 100. In one embodiment, the camera attachment 900 may be configured to attach to an opening 110 in the top side of the light box 100 using an insert member 902. The insert member 902 may be sized to fit in one of the openings 110 in the top side 102 of the light box 100 and may include attachment means, such as a friction fit, a clip, a magnet, or the like, that secures the camera attachment 900 to the top side 102.

A camera device, such as a DSLR camera, a point-and-shoot camera, a smart device with an integrated camera, or the like, may be mounted to the camera attachment at a mounting plate 904 using attachment means, such as a screw, an adhesive, a hook and loop mount, a button, a snap, a magnet, or the like. The camera device may be mounted to the mounting plate 904 in such a manner that the lens of the camera faces downward through a different opening 110 in the top side 102 to capture images of an object within the light box 100.

The camera attachment 900, in certain embodiments, includes a support member 906 that supports the camera when the camera is attached to the mounting plate 904. In such an embodiment, the camera may rest against the support member 906 such that the lens of the camera is pointed though the support member 906. Furthermore, the camera attachment 900 may include an adjustable arm 908 that allows the position of the camera to be adjusted to a preferred angle, height, or the like.

FIG. 10 depicts one embodiment of inserts 1000 for the light box 100. The inserts 1000 may be disposed on the bottom side 104 of the light box 100 such that images can be captured of the inserts from an opening 110 on the top side 102 of the light box 100. The inserts 1000 may include a plurality of openings 1002 where a user can insert different images.

The inserts 1000 may be used for various types of applications, such as for creating business cards, creating baseball cards, creating layouts for images of different sizes, for creating images with different borders, creating scrapbook pages, or the like. The inserts 1000 may include different foreground colors, patterns, layouts, or the like. For example, a user may place different individual images of players of a youth baseball team into each open slot 1002 of a baseball card insert and then take an image of the insert from an opening 110 on the top side 102 of the light box 100. In this manner, the user can create a customized layout or spread of different images by using the inserts 1000 as a guide.

Figure 11:
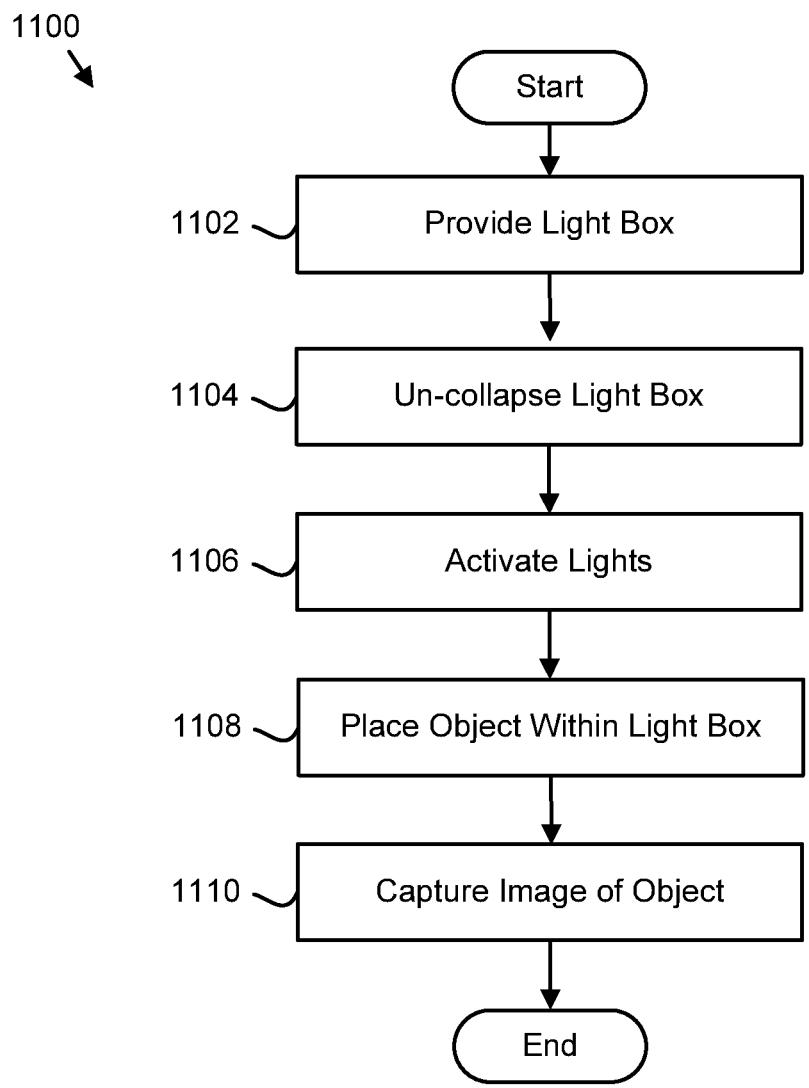
FIG. 11 is a schematic flow art diagram illustrating one embodiment of a method for using a collapsible light box.

FIG. 11 depicts a schematic flow-chart diagram of a method 1100 for a collapsible light box 100. In certain embodiments, a user performs the steps of the method 1100 described below. In one embodiment, the method 1100 begins and the method 1100 provides 1102 a collapsible light box 100 in a collapsed state. The method 1100 un-collapses 1104 the collapsible light box 100 by lifting the top side 102, for example, which causes the left and right sides 106a-b to extend vertically. The back side 108 also becomes disposed against the bottom side 104 when the light box 100 is un-collapsed, and the left and right sides 106a-b rest against the back side 108 using the notches described above with reference to FIG. 4B.

Furthermore, the method 1100 activates 1106 the lighting elements 116 of the light box 100, which may derive power from a provided power supply. The power supply may use an external battery, an AC power source, and/or a solar power source. The method 1100 places 1108 an object inside the light box 100 and the method 1100 captures 1110 an image of the object within the light box 100 using a camera device. A user may place the camera device on the top side 102 of the light box 100 to capture 1110 a top view of the object. A user may also use the attachment 500 to capture 1110 an image from the front of the light box 100, and the method 1100 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
   a substantially cube-shaped structure comprising a top side, a bottom side, a rear side, a left side, and a right side, wherein an inside of the structure is accessible through a front side of the structure, the front side being open;

one or more lighting elements disposed within the structure, the one or more lighting elements illuminating the inside of the structure; and one or more joints located along a surface of each of the right side and the left side of the structure, the one or more joints allowing the left side to collapse inward on itself and the right side to collapse inward on itself to allow the structure to collapse into a substantially flat shape, wherein, when the structure is in an un-collapsed position, the joints cause each of the right and left sides to angle in towards the inside of the structure.

2. The apparatus of claim 1, wherein the one or more joints on each of the right side and the left side comprise one or more hinges.

3. The apparatus of claim 2, wherein the one or more hinges comprise one or more extrusion hinges.

4. The apparatus of claim 1, further comprising one or more openings located on the top side, wherein a size of each of the one or more openings is adjustable.

5. The apparatus of claim 1, wherein the rear side is coupled to the top side by a joint, the rear side comprising one or more openings configured to receive one or more guide members coupled to the bottom side such that the guide members are disposed within the one or more openings to secure the rear side to the bottom side when the structure is in an un-collapsed position.

6. The apparatus of claim 1, wherein each of the right side and the left side comprise one or more notches disposed along an edge of the right side and the left side configured to receive an edge of the back side such that the right side and the left side are secured against the back side.

7. The apparatus of claim 1, wherein the structure is manufactured of plastic using one of a thermoforming and injection-molding process.

8. A system comprising:
a power supply;
a substantially cube-shaped structure comprising a top side, a bottom side, a rear side, a left side, and a right side, wherein an inside of the structure is accessible through a front side of the structure, the front side being open;

one or more lighting elements disposed within the structure, the one or more lighting elements illuminating the inside of the structure and receiving power from the power supply; and one or more joints located along a surface of each of the right side and the left side of the structure, the one or more joints allowing the left side to collapse inward on itself and the right side to collapse inward on itself to allow the structure to collapse into a substantially flat shape, wherein, when the structure is in an un-collapsed position, the joints cause each of the right and left sides to angle in towards the inside of the structure.

9. The system of claim 8, wherein the power supply comprises one or more of a battery and a solar panel.

10. The system of claim 8, further comprising one or more interchangeable plates configured to be disposed on an interior face of one of the right side and the left side, the interchangeable plates modifying an effect of an illumination of the one or more lighting elements within the structure.

11. The system of claim 8, further comprising a lighting controller configured to control one or more of a brightness, an intensity, a color, and a blinking rate of the one or more lighting elements.

12. The system of claim 8, further comprising one or more interchangeable lighting filters configured to be disposed on one or more lighting elements.

13. The system of claim 8, wherein the one or more lighting elements comprise one or more of a strip of light emitting diodes, a black light, and an ultra-violet light.

14. The system of claim 8, further comprising a slot located beneath the bottom side configured to receive a magnetic sheet such that magnetic items placed within the structure are secured to the bottom side.

15. The system of claim 8, further comprising a platform configured to attach to an opening located on the top side and disposed perpendicular to a front of the structure such that objects within the structure are visible to a camera placed on the platform.

16. The system of claim 15, wherein the platform comprises one or more lighting elements disposed along a back side of the platform and directed at the inside of the structure.

17. The system of claim 8, further comprising a hood configured to attach to the structure and extend a linear length of the bottom side of the structure from a front of the structure, the hood covering an opening where the front side is removed to prevent light from entering the structure from the front of the structure.

18. The system of claim 8, further comprising a stand configured to be disposed on the bottom side within the structure, the bottom side comprising one or more openings configured to receive the stand, wherein one or more objects are placed on the stand within the structure.

19. The system of claim 8, further comprising a mechanism configured to un-collapse and collapse the structure without any intervention by a user.

20. The system of claim 8, further comprising a backdrop placed within the structure, the backdrop comprising a background for an object within the structure.

21. A method comprising:
providing a light box comprising:
a power supply;
a top side, a bottom side, a rear side, a left side, and a right side, wherein an inside of the structure is accessible through a front side of the structure, the front side being open;

one or more lighting elements disposed within the light box, the one or more lighting elements illuminating the inside of the light box and receiving power from the power supply; and one or more joints located along a surface of each of the right side and the left side of the structure, the one or more joints allowing the left side to collapse inward on itself and the right side to collapse inward on itself to allow the structure to collapse into a substantially flat shape, wherein, when the structure is in an un-collapsed position, the joints cause each of the right and left sides to angle in towards the inside of the structure;

un-collapsing the light box;
activating the one or more lighting elements.

22. The method of claim 21, further comprising collapsing the light box into a substantially flat shape.

23. The method of claim 21, further comprising capturing one or more images of an object placed within the structure from one of an opening in the top side of the light box and a front of the light box.

24. The method of claim 21, further comprising disposing a plate on an interior face of one of the right side and the left side, the plate changing an effect of an illumination of the one or more lighting elements within the light box.

* * * * *